United States Patent
Qiu

(10) Patent No.: US 9,574,132 B2
(45) Date of Patent: Feb. 21, 2017

(54) COMPOSITE NANOPARTICLES INCLUDING A THIOETHER LIGAND

(71) Applicant: 3M INNOVATIVE PROPERTIES COMPANY, St. Paul, MN (US)

(72) Inventor: Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/117,474

(22) PCT Filed: Mar. 20, 2015

(86) PCT No.: PCT/US2015/021707
§ 371 (c)(1),
(2) Date: Aug. 9, 2016

(87) PCT Pub. No.: WO2015/153148
PCT Pub. Date: Oct. 8, 2015

(65) Prior Publication Data
US 2017/0022412 A1    Jan. 26, 2017

Related U.S. Application Data

(60) Provisional application No. 61/974,079, filed on Apr. 2, 2014.

(51) Int. Cl.
| | | |
|---|---|---|
| C09K 11/02 | (2006.01) | |
| C09K 11/88 | (2006.01) | |
| C09K 11/70 | (2006.01) | |
| G02F 1/1335 | (2006.01) | |
| B32B 7/12 | (2006.01) | |

(52) U.S. Cl.
CPC .............. *C09K 11/025* (2013.01); *B32B 7/12* (2013.01); *C09K 11/02* (2013.01); *C09K 11/70* (2013.01); *C09K 11/883* (2013.01); *G02F 1/1336* (2013.01); *B32B 2250/02* (2013.01); *B32B 2250/24* (2013.01); *B32B 2255/10* (2013.01); *B32B 2255/26* (2013.01); *B32B 2307/422* (2013.01); *B32B 2457/206* (2013.01); *G02F 1/133615* (2013.01); *G02F 2001/133614* (2013.01)

(58) Field of Classification Search
CPC ....... C09K 11/025; C09K 11/02; C09K 11/70; C09K 11/883; B32B 7/12; B32B 2250/02; B32B 2250/24; B32B 2255/10; B32B 2255/26; B32B 2307/422; B32B 2457/206; G02F 1/133615; G02F 2001/133614; Y10T 428/2982
USPC ...................................................... 428/402
See application file for complete search history.

(56) References Cited

U.S. PATENT DOCUMENTS

| | | | |
|---|---|---|---|
| 3,705,208 A | 12/1972 | Nakamuta | |
| 4,622,412 A | 11/1986 | Piskoti | |
| 4,857,434 A | 8/1989 | Klinger | |
| 5,015,717 A | 5/1991 | Martin | |
| 5,462,835 A | 10/1995 | Mirle | |
| 5,587,433 A | 12/1996 | Boeckeler | |
| 6,451,958 B1 | 9/2002 | Fan | |
| 6,949,206 B2 | 9/2005 | Whiteford | |
| 7,018,713 B2 | 3/2006 | Padiyath | |
| 7,160,613 B2 | 1/2007 | Bawendi | |
| 8,283,412 B2 | 10/2012 | Liu | |
| 8,425,803 B2 | 4/2013 | Parce | |
| 8,440,736 B2 | 5/2013 | Hoyle | |
| 2008/0231170 A1 | 9/2008 | Massato | |
| 2011/0051047 A1 | 3/2011 | O'Neil | |
| 2011/0226991 A1* | 9/2011 | Treadway | .......... A61K 49/0067 252/301.6 S |
| 2012/0241646 A1 | 9/2012 | Zhong | |
| 2012/0270231 A1 | 10/2012 | Smith | |
| 2013/0148057 A1 | 6/2013 | Kang | |
| 2013/0189367 A1* | 7/2013 | Zhang | ................... A61K 9/1676 424/493 |
| 2013/0334557 A1 | 12/2013 | Uchida | |
| 2014/0001405 A1 | 1/2014 | Guo | |

FOREIGN PATENT DOCUMENTS

| | | |
|---|---|---|
| WO | WO 2010-039897 | 4/2010 |
| WO | WO 2015-094646 | 6/2015 |
| WO | WO 2015-095032 | 6/2015 |
| WO | WO 2015-095296 | 6/2015 |
| WO | WO 2015-138174 | 9/2015 |

OTHER PUBLICATIONS

Xin Huang et al., "Biolabeling Hematopoietic System Cells Using Near-Infrared Fluorescent Gold Nanoclusters", Journal of Physical Chemistry C., vol. 115, No. 34, Sep. 1, 2011, pp. 16753-16763.*
Derfus Austin M et al: "Targeted quantum dot conjugates for siRNA delivery", Bioconjugate Chemistry, ACS, Washington, DC, US, vol. 18, No. 5, Sep. 1, 2007, pp. 1391-1396.*
Alivisatos, "Semiconductor clusters, nanocrystals, and quantum dots", Science, 1996, vol. 271, No. 5251, pp. 933-937.
Dabbousi, "(CdSe)ZnS Core-Shell Quantum Dots: Synthesis and Characterization of a Size Series of Highly Luminescent Nanocrystallites", J. Phys. Chem. B, 1997, vol. 101, No. 46, pp. 9463-9475.
Denayer, "Low-coverage adsorption properties of the metal-organic framework", May 14, 2019, PCCP, vol. 11, No. 18, p. 3325.
Derfus, "Targeted quantum dot conjugates for siRNA delivery", Bioconjugate Chemistry, 2007, vol. 18, No. 5, pp. 1391-1396, XP009137582.
Hines, "Synthesis and Characterization of Strongly Luminescing ZnS-Capped CdSe Nanocrystals", J. Phys.Chem, 1996, vol. 100, No. 2, pp. 468-471.

(Continued)

*Primary Examiner* — Leszek Kiliman
(74) *Attorney, Agent, or Firm* — Kent S. Kokko

(57) ABSTRACT

A composite particle that includes: a fluorescent semiconductor core/shell nanoparticle (preferably, nanocrystal); and a thioether-substituted ligand.

22 Claims, 2 Drawing Sheets

(56) References Cited

OTHER PUBLICATIONS

Huang "Biolabeling Hematopoietic System Cells Using Near-Infrared Fluorescent Gold Nanoclusters", Journal of Physical Chemistry, 2011, vol. 115, No. 34,1 pp. 16753-16763, XP055192952.
Kamio, "Surface-active properties and thermal behavior of S-alkylthio-carboxylic acids and their potassium salts", J. Am. Oil Chem. Soc., Jul. 1995, vol. 72, No. 7, pp. 805-809.
Kim, "In situ ligand exchange of thiol-capped CuInS2/ZnS quantum dots at growth stage without affecting luminescent characteristics", J Colloid Interface Sci, 2011, vol. 363, pp. 703-706.
Luan, "Mercaptopropionic acid capped CdSe/ZnS quantum dots as fluorescence probe for lead(II)", J. Nanopart Res, 2012, vol. 14;762, pp. 1-8.
Murray, "Synthesis and characterization of nearly monodisperse CdE (E=sulfur, selenium, tellurium) semiconductor nanocrystallites," J. Am. Chem. Soc., 1993, vol. 115, No. 19, pp. 8706-8715.
Peng, "Epitaxial growth of highly luminescent CdSe/CdS Core/Shell nanocrystals with photostability and electronic accessibility," J. Am. Chem. Soc., 1997, vol. 119, pp. 7019-7029.
Pong, "Modified Ligand-Exchange for Efficient Solubilization of CdSe/ZnS Quantum Dots in Water: A Procedure Guided by Computational Studies", Langmuir, 2008, vol. 24, No. 10, pp. 5270-5276.
Wang, "Surface Modification of CdSe and CdSe/ZnS Semiconductor Nanocrystals with Poly (N,N-dimethylaminoethyl methacrylate)", Macromolecules, 2006, vol. 39, pp. 3664-3672.
International Search report for PCT International Application No. PCT/US2015/021707 mailed on Jun. 9, 2015, 4 pages.

\* cited by examiner

COMPOSITE NANOPARTICLES INCLUDING A THIOETHER LIGAND

CROSS REFERENCE TO RELATED APPLICATIONS

This application is a national stage filing under 35 U.S.C. 371 of PCT/US2015/021707, filed Mar. 20, 2015, which claims the benefit of U.S. Application No. 61/974,079, filed Apr. 2, 2014, the disclosure of which is incorporated by reference in its/their entirety herein.

BACKGROUND

Quantum Dot Enhancement Films (QDEF) are used as the light source for LCD displays. Red and green quantum dots are used in QDEF with a blue LED as the light source to give the full spectrum of colors. This has the advantage of improving the color gamut over the typical LCD display and keeping the energy consumption low compared to LED displays.

Once the quantum dots are synthesized, they are treated with an organic ligand that binds to the exterior surface of the quantum dot. Colloidal quantum dot nanoparticles (preferably, nanocrystals) that are stabilized with organic ligands can have improved quantum yields due to passivating surface traps, controlling dispersion stability in solvent or polymer matrix, stabilizing against aggregation and degradation, and influencing the kinetics of nanoparticle (preferably, nanocrystal) growth during synthesis. Therefore, optimizing the organic ligand is important for achieving optimal quantum yield, processability, and functional lifetime in QDEF.

SUMMARY

Composite particles are provided that are capable of fluorescence and suitable for use in quantum dot enhancement films.

In one aspect, the present disclosure provides a composite particle that includes: a fluorescent semiconductor core/shell nanoparticle (preferably, nanocrystal); and a thioether substituted ligand attached to the core/shell nanoparticle outer surface. In one aspect, the present disclosure provides a composite particle that includes: a fluorescent semiconductor core/shell nanoparticle (preferably, nanocrystal); and a thioether substituted ligand attached to the core/shell nanoparticle outer surface. The fluorescent semiconductor core/shell nanoparticle includes: an InP core; an inner shell overcoating the core, wherein the inner shell includes zinc selenide and zinc sulfide; and an outer shell overcoating the inner shell, wherein the outer shell includes zinc sulfide.

The thioether substituted ligand (prior to attachment to the nanoparticle) has the following formula I:

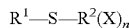   I wherein
$R^1$ is (hetero)hydrocarbyl group or a (meth)acrylate oligomer group;
$R^2$ is a hydrocarbyl group;
n at least one;
X is an electron-donating group.

In some embodiments, $R^1$ is selected from (hetero)hydrocarbyl groups, including aryl groups and linear, branched or cyclic alkyl groups, said alkyl optionally containing in-chain functional groups including —O—, —CO$_2$—, —NR—, —CONR—, —SO$_2$—, —OC(O)NR—, where R is H or $C_1$-$C_4$ alkyl, and. In particular, $R^1$ may be selected from alkyl groups having 2 to 50 carbon atoms. In another embodiment $R^1$ may be selected from alkyloxyalkylene having 2 to 50 carbon atoms.

In some embodiments, $R^1$ may be selected from alkyl, aryl, aralkyl and alkaryl groups, including phenyl, biphenyl and napthyl which may be substituted with one of more alkyl groups.

In some embodiments, $R^1$ is selected from (meth)acrylate oligomers having the formula:

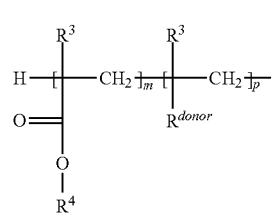   II wherein
each $R^3$ is independently H or $CH_3$
each $R^4$ is $C_1$-$C_{30}$ alkyl,
$R^{donor}$ comprises a π electron-donating group X,
m is at least 2, preferably 2-100, more preferably 2-50;
p may be zero or non-zero. The X of the $R^{donor}$ group may be the same or a different X group than that of the ligand of Formula I.

The π electron-donating group X can be any functional group that can donate electron density through resonance to the electron-deficient nanoparticles. For example X may be selected from —CO$_2$H, —OH, —P(O)(OH)$_2$, —P(O)OH, —NH$_2$ and —SO$_3$H.

The composite particles can be used in coatings and films for use in optical displays. The fluorescent semiconductor nanoparticles emit a fluorescence signal at a second wavelength of light when excited by a first wavelength of light that is shorter than the second wavelength of light.

As used herein
"Alkyl" means a linear or branched, cyclic or acylic, saturated monovalent hydrocarbon.
"Alkylene" means a linear or branched unsaturated divalent hydrocarbon.
"Alkenyl" means a linear or branched unsaturated hydrocarbon.
"Aryl" means a monovalent aromatic, such as phenyl, naphthyl and the like.
"Arylene" means a polyvalent, aromatic, such as phenylene, naphthalene, and the like.
"Aralkylene" means a group defined above with an aryl group attached to the alkylene, e.g., benzyl, 1-naphthylethyl, and the like.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", and "aryl" supra.

The term "composite particle" as used herein refers to a nanoparticle, which is typically in the form of a core/shell nanoparticle (preferably, nanocrystal), having any associated organic coating or other material on the surface of the nanoparticle that is not removed from the surface by ordinary solvation. Such composite particles are useful as "quantum dots," which have a tunable emission in the near ultraviolet (UV) to far infrared (IR) range as a result of the use of a semiconductor material.

The term "nanoparticle" refers to a particle having an average particle diameter in the range of 0.1 to 1000 nanometers such as in the range of 0.1 to 100 nanometers or in the range of 1 to 100 nanometers. The term "diameter" refers not only to the diameter of substantially spherical particles but also to the distance along the smallest axis of the structure. Suitable techniques for measuring the average particle diameter include, for example, scanning tunneling microscopy, light scattering, and transmission electron microscopy.

A "core" of a nanoparticle is understood to mean a nanoparticle (preferably, a nanocrystal) to which no shell has been applied or to the inner portion of a core/shell nanoparticle. A core of a nanoparticle can have a homogenous composition or its composition can vary with depth inside the core. Many materials are known and used in core nanoparticles, and many methods are known in the art for applying one or more shells to a core nanoparticle. The core has a different composition than the one more shells. The core typically has a different chemical composition than the shell of the core/shell nanoparticle.

As used herein, the term "actinic radiation" refers to radiation in any wavelength range of the electromagnetic spectrum. The actinic radiation is typically in the ultraviolet wavelength range, in the visible wavelength range, in the infrared wavelength range, or combinations thereof. Any suitable energy source known in the art can be used to provide the actinic radiation.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION

Figure 1:
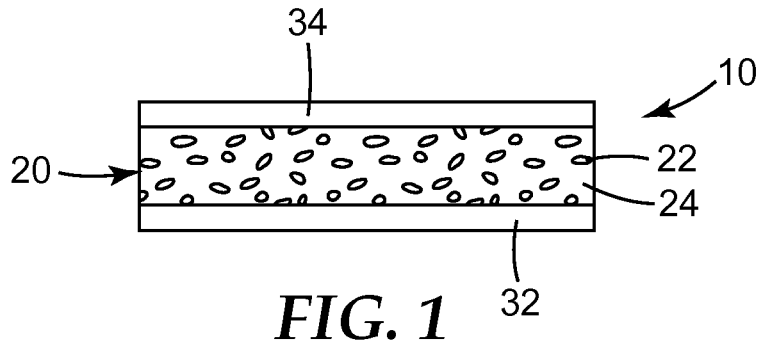
FIG. 1 is a schematic side elevation view of an edge region of an illustrative film article including quantum dots.

The present disclosure provides composite particles that contain fluorescent semiconductor nanoparticles that can fluoresce when excited with actinic radiation. The composite particles can be used in coatings and films for use in optical displays.

Fluorescent semiconductor nanoparticles emit a fluorescence signal when suitably excited. They fluoresce at a second wavelength of actinic radiation when excited by a first wavelength of actinic radiation that is shorter than the second wavelength. In some embodiments, the fluorescent semiconductor nanoparticles can fluoresce in the visible region of the electromagnetic spectrum when exposed to wavelengths of light in the ultraviolet region of the electromagnetic spectrum. In other embodiments, the fluorescent semiconductor nanoparticles can fluoresce in the infrared region when excited in the ultraviolet or visible regions of the electromagnetic spectrum. In still other embodiments, the fluorescent semiconductor nanoparticles can fluoresce in the ultraviolet region when excited in the ultraviolet region by a shorter wavelength of light, can fluoresce in the visible region when excited by a shorter wavelength of light in the visible region, or can fluoresce in the infrared region when excited by a shorter wavelength of light in the infrared region. The fluorescent semiconductor nanoparticles are often capable of fluorescing in a wavelength range such as, for example, at a wavelength up to 1200 nanometers (nm), or up to 1000 nm, up to 900 nm, or up to 800 nm. For example, the fluorescent semiconductor nanoparticles are often capable of fluorescence in the range of 400 to 800 nanometers.

The nanoparticles have an average particle diameter of at least 0.1 nanometer (nm), or at least 0.5 nm, or at least 1 nm. The nanoparticles have an average particle diameter of up to 1000 nm, or up to 500 nm, or up to 200 nm, or up to 100 nm, or up to 50 nm, or up to 20 nm, or up to 10 nm. Semiconductor nanoparticles, particularly with sizes on the scale of 1-10 nm, have emerged as a category of the most promising advanced materials for cutting-edge technologies.

Semiconductor materials include elements or complexes of Group 2-Group 16, Group 12-Group 16, Group 13-Group 15, Group 14-Group 16, and Group 14 semiconductors of the Periodic Table (using the modern group numbering system of 1-18). Some suitable quantum dots include a metal phosphide, a metal selenide, a metal telluride, or a metal sulfide. Exemplary semiconductor materials include, but are not limited to, Si, Ge, Sn, BN, BP, BAs, AlN, AlP, AlAs, AlSb, GaN, GaP, GaAs, GaSb, InN, InP, InAs, InSb, AN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, MgTe, GeS, GeSe, GeTe, SnS, SnSe, SnTe, PbO, PbS, PbSe, PbTe, CuF, CuCI, CuBr, CuI, $Si_3N_4$, $Ge_3N_4$, $Al_2O_3$, $(Ga,In)_2(S,Se,Te)_3$, $Al_2CO$, CaS, CaSe, CaTe, SrS, SrSe, SrTe, BaS, BaSe, BaTe, and an appropriate combination of two or more such semiconductors. These semiconductor materials can be used for the core, the one or more shell layers, or both.

In certain embodiments, exemplary metal phosphide quantum dots include indium phosphide and gallium phosphide, exemplary metal selenide quantum dots include cadmium selenide, lead selenide, and zinc selenide, exemplary metal sulfide quantum dots include cadmium sulfide, lead sulfide, and zinc sulfide, and exemplary metal telluride quantum dots include cadmium telluride, lead telluride, and zinc telluride. Other suitable quantum dots include gallium arsenide and indium gallium phosphide. Exemplary semiconductor materials are commercially available from Evident Technologies (Troy, N.Y.).

Nanocrystals (or other nanostructures) for use in the present invention can be produced using any method known to those skilled in the art. Suitable methods are disclosed in U.S. patent application Ser. No. 10/796,832, filed Mar. 10, 2004, U.S. Pat. No. 6,949,206 (Whiteford) and U.S. Provisional Patent Application No. 60/578,236, filed Jun. 8, 2004, the disclosures of each of which are incorporated by reference herein in their entireties. The nanocrystals (or other nanostructures) for use in the present invention can be produced from any suitable material, suitably an inorganic material, and more suitably an inorganic conductive or semiconductive material. Suitable semiconductor materials include those disclosed in U.S. patent application Ser. No. 10/796,832 and include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AN, AlP, AlAs, AlSb, GaN, GaP, GaAs, GaSb, InN, InP, InAs, InSb, AN, AlP, As, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Ga,In)_2(S,Se,Te)_3$, $Al_2CO$, and an appropriate combination of two or more such semiconductors.

In certain aspects, the semiconductor nanocrystals or other nanostructures may comprise a dopant from the group consisting of: a p-type dopant or an n-type dopant. The nanocrystals (or other nanostructures) useful in the present invention can also comprise II-VI or III-V semiconductors. Examples of II-VI or III-V semiconductor nanocrystals and nanostructures include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table.

Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any known method can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993). This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes. Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape.

In semiconductor nanocrystals, photo-induced emission arises from the band edge states of the nanocrystal. The band-edge emission from nanocrystals competes with radiative and non-radiative decay channels originating from surface electronic states. X. Peng, et al., J. Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., J. Am. Chem. Soc. 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials. Additionally, the spherical shape acts to minimize interfacial strain energy from the large radius of curvature, thereby preventing the formation of dislocations that could degrade the optical properties of the nanocrystal system.

In suitable embodiments, ZnS can be used as the shell material using known synthetic processes, resulting in a high-quality emission. As above, if necessary, this material can be easily substituted, e.g., if the core material is modified. Additional exemplary core and shell materials are described herein and/or known in the art.

For many applications of quantum dots, two factors are typically considered in selecting a material. The first factor is the ability to absorb and emit visible light. This consideration makes InP a highly desirable base material. The second factor is the material's photoluminescence efficiency (quantum yield). Generally, Group 12-Group 16 quantum dots (such as cadmium selenide) have higher quantum yield than Group 13-Group 15 quantum dots (such as InP). The quantum yield of InP cores produced previously has been very low (<1%), and therefore the production of a core/shell structure with InP as the core and another semiconductor compound with higher bandgap (e.g., ZnS) as the shell has been pursued in attempts to improve the quantum yield.

Thus, the fluorescent semiconductor nanoparticles (i.e., quantum dots) of the present disclosure include a core and a shell at least partially surrounding the core. The core/shell nanoparticles can have two distinct layers, a semiconductor or metallic core and a shell surrounding the core of an insulating or semiconductor material. The core often contains a first semiconductor material and the shell often contains a second semiconductor material that is different than the first semiconductor material. For example, a first Group 12-Group 16 (e.g., CdSe) semiconductor material can be present in the core and a second Group 12-Group 16 (e.g., ZnS) semiconductor material can be present in the shell.

In certain embodiments of the present disclosure, the core includes a metal phosphide (e.g., indium phosphide (InP), gallium phosphide (GaP), aluminum phosphide (AlP)), a metal selenide (e.g., cadmium selenide (CdSe), zinc selenide (ZnSe), magnesium selenide (MgSe)), or a metal telluride (e.g., cadmium telluride (CdTe), zinc telluride (ZnTe)). In certain embodiments, the core includes a metal phosphide (e.g., indium phosphide) or a metal selenide (e.g., cadmium selenide). In certain preferred embodiments of the present disclosure, the core includes a metal phosphide (e.g., indium phosphide).

The shell can be a single layer or multilayered. In some embodiments, the shell is a multilayered shell. The shell can include any of the core materials described herein. In certain embodiments, the shell material can be a semiconductor material having a higher bandgap energy than the semiconductor core. In other embodiments, suitable shell materials can have good conduction and valence band offset with respect to the semiconductor core, and in some embodiments, the conduction band can be higher and the valence band can be lower than those of the core. For example, in certain embodiments, semiconductor cores that emit energy in the visible region such as, for example, CdS, CdSe, CdTe, ZnSe, ZnTe, GaP, InP, or GaAs, or near IR region such as, for example, InP, InAs, InSb, PbS, or PbSe may be coated with a shell material having a bandgap energy in the ultraviolet regions such as, for example, ZnS, GaN, and magnesium chalcogenides such as MgS, MgSe, and MgTe. In other embodiments, semiconductor cores that emit in the near IR region can be coated with a material having a bandgap energy in the visible region such as CdS or ZnSe.

Formation of the core/shell nanoparticles may be carried out by a variety of methods. Suitable core and shell precursors useful for preparing semiconductor cores are known in the art and can include Group 2 elements, Group 12 elements, Group 13 elements, Group 14 elements, Group 15 elements, Group 16 elements, and salt forms thereof. For example, a first precursor may include metal salt (M+X−) including a metal atom (M+) such as, for example, Zn, Cd, Hg, Mg, Ca, Sr, Ba, Ga, In, Al, Pb, Ge, Si, or in salts and a counter ion (X−), or organometallic species such as, for example, dialkyl metal complexes. The preparation of a coated semiconductor nanocrystal core and core/shell nanocrystals can be found in, for example, Dabbousi et al. (1997) *J. Phys. Chem. B* 101:9463, Hines et al. (1996) *J. Phys. Chem.* 100: 468-471, and Peng et al. (1997) *J. Amer. Chem. Soc.* 119:7019-7029, as well as in U.S. Pat. No. 8,283,412 (Liu et al.) and International Publication No. WO 2010/039897 (Tulsky et al.).

In certain preferred embodiments of the present disclosure, the shell includes a metal sulfide (e.g., zinc sulfide or cadmium sulfide). In certain embodiments, the shell includes a zinc-containing compound (e.g., zinc sulfide or zinc selenide). In certain embodiments, a multilayered shell includes an inner shell overcoating the core, wherein the inner shell includes zinc selenide and zinc sulfide. In certain embodiments, a multilayered shell includes an outer shell overcoating the inner shell, wherein the outer shell includes zinc sulfide.

In some embodiments, the core of the shell/core nanoparticle contains a metal phosphide such as indium phosphide, gallium phosphide, or aluminum phosphide. The shell contains zinc sulfide, zinc selenide, or a combination thereof. In some more particular embodiments, the core contains indium phosphide and the shell is multilayered with the inner shell containing both zinc selenide and zinc sulfide and the outer shell containing zinc sulfide.

The thickness of the shell(s) may vary among embodiments and can affect fluorescence wavelength, quantum yield, fluorescence stability, and other photostability characteristics of the nanocrystal. The skilled artisan can select the appropriate thickness to achieve desired properties and may modify the method of making the core/shell nanoparticles to achieve the appropriate thickness of the shell(s).

The diameter of the fluorescent semiconductor nanoparticles (i.e., quantum dots) of the present disclosure can affect the fluorescence wavelength. The diameter of the quantum dot is often directly related to the fluorescence wavelength. For example, cadmium selenide quantum dots having an average particle diameter of about 2 to 3 nanometers tend to fluoresce in the blue or green regions of the visible spectrum while cadmium selenide quantum dots having an average particle diameter of about 8 to 10 nanometers tend to fluoresce in the red region of the visible spectrum.

The fluorescent semiconductor nanoparticles are surface-modified with a surface modifying agent to enhance their dispersibility in a liquid. That is, the surface modifying agent tends to increase compatibility of the fluorescent semiconductor nanoparticles with a non-aqueous solvent, and any other components of a composition (e.g., a polymeric material, precursors of the polymeric material, or combinations thereof).

Surface modification involves combining the fluorescent semiconductor nanoparticles with a surface modifying agent or combination of surface modifying agents that attach to the surface of the fluorescent semiconductor nanoparticles and that modify the surface characteristics of the fluorescent semiconductor nanoparticles. In this context, "attach" or "attached" refers to the association between the surface modifying agent and the fluorescent semiconductor nanoparticle, which is of sufficient stability for the surface modified particles to be suitable for their intended use. The association may be physical (e.g., by absorption or adsorption), chemical (e.g., through covalent bonds, ionic bonds, hydrogen bonds), or a combination thereof.

Surface modifying agents include one or more groups for attaching to the surface of the fluorescent semiconductor nanoparticles and one or more group for various functions, such as compatibilizing the particles with a solvent, improving the quantum yield of the material. The groups attach to the surface, for example, by adsorption, absorption, formation of an ionic bond, formation of a covalent bond, formation of a hydrogen bond, or a combination thereof.

Quantum efficiency (also known in the literature as quantum yield) is the number of defined events which occur per photon absorbed (e.g., the number of photons emitted by the nanoparticles per photon absorbed by the nanoparticles). Accordingly, one general embodiment of the present disclosure provides a population of nanoparticles that displays a quantum efficiency of 45% or greater, or 50% or greater, or 55% or greater, or 60% or greater.

Surface modifying agents useful in the present disclosure are thioether ligands of Formula I (supra). Such thioether ligands can be prepared by nucleophilic substitution of a compound of the formula:

$$R^{10}\text{—Y};\qquad\qquad\text{III}$$

with a thiol of the formula:

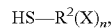

$$\text{HS—}R^2(X)_n,\qquad\qquad\text{IV}$$

where
R$^{10}$ is a (hetero)hydrocarbyl group,
Y is a leaving group including halide, tosylate, acetate, triflate, and the like;
R$^2$ is an alkylene;
n at least one;
X is a π electron-donating group.

Alternatively, compound of Formula I may be prepared by free radical addition of a thiol compound of Formula IV to an olefin of the Formula V

   V.

In other embodiments, ligands of the formula I may be made by Michael addition of a thiol of the formula R$^1$—SH to an acrylate of the formula CH$_2$=CH(R$^3$)CO$_2$R$^3$, followed by hydrolysis of the ester to form ligands of the formula R$^1$—S—CH$_2$CHR$^3$CO$_2$H.

Compounds of Formula III include, such as n-C$_6$H$_{13}$—Br, (Me)$_2$CH(CH$_2$)$_4$—Br, n-C$_8$H$_{17}$—Br, i-C$_8$H$_{17}$—Br, t-Bu-CH$_2$—Br, C$_{10}$H$_{21}$—Br, C$_{12}$H$_{25}$—Br, C$_{14}$H$_{29}$—Br, C$_{16}$H$_{33}$—Br, C$_{18}$H$_{37}$—Br, C$_{10}$H$_{21}$—OSO$_2$CH$_3$, C$_{10}$H$_{21}$—OSO$_2$PhCH$_3$, C$_{10}$H$_{21}$—OSO$_2$CF$_3$, C$_{16}$H$_{33}$—I, Compounds of Formula IV include, such as HS—CH$_2$CO$_2$H, HS—CH$_2$CH$_2$CO$_2$H, HS—(CH$_2$)$_{10}$CO$_2$H, HS—CH(CO$_2$H)CH$_2$CO$_2$H, HS—CH$_2$CH$_2$NH$_2$, HS—CH$_2$CH(OH)CH$_2$OH, HS—CH$_2$CH$_2$CO$_2$CH$_2$CH(OH)CH$_2$OH, HS—CH$_2$CH$_2$CH$_2$SO$_3$H, HS-Ph-CO$_2$H, and HS-Ph-NH$_2$.

Compounds of Formula V include, such as C$_4$H$_9$—CH=CH$_2$, C$_5$H$_{11}$—CH=CH$_2$, C$_6$H$_{13}$—CH=CH$_2$, C$_7$H$_{15}$—CH=CH$_2$, C$_8$H$_{17}$—CH=CH$_2$, C$_9$H$_{19}$—CH=CH$_2$, C$_{10}$H$_{21}$—CH=CH$_2$, C$_{11}$H$_{23}$—CH=CH$_2$, C$_{12}$H$_{25}$—CH=CH$_2$, C$_{13}$H$_{27}$—CH=CH$_2$, C$_{14}$H$_{29}$—CH=CH$_2$, and C$_{16}$H$_{33}$—CH=CH$_2$, With regard to the ligands of Formula I, in some embodiments, the electron donor group, X, is a carboxylic acid group, and subscript n is 1, to provide ligands of the formula:

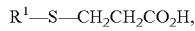   Ia where R$^1$ is (hetero)hydrocarbyl group.

With regard to the ligands of Formula I, in some embodiments, the electron donor group, X, is a carboxylic acid group, and subscript n is 2, to provide ligands of the formula:

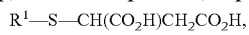   Ib where R$^1$ is (hetero)hydrocarbyl group.

With further regard to the oligomeric ligand of Formula II, the second optional monomeric unit with the subscript p may be a vinyl monomer having a electron donor group such as acrylic acid, vinylsulfonic acid, vinylphosphonic acid, and vinyl phosphoric acid, i.e. R$^{donor}$ is X of Formula I. In other words, R$^{donor}$ may be —CO$_2$H, —SO$_3$H, —P(O)(OH)$_2$, —OP(O)(OH), —OH and —NH$_2$.

In other embodiments, the second monomer is a (meth)acrylate monomer having an electron donor group, i.e. R$^{donor}$ is —CO—O—R$^7$—X, where R$^7$ is a C$_2$-C$_{10}$ alkylene, and X is an electron donating group.

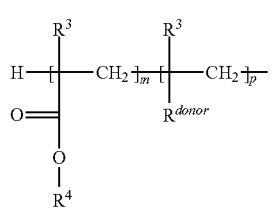   II

In embodiments where R$^{donor}$ is a (meth)acrylate oligomer, and X is a carboxylic acid group, the oligomeric ligands may be represented by the formula:

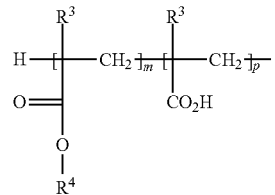

wherein
each R$^3$ is independently —H or —CH$_3$,
each R$^4$ is C$_1$-C$_{30}$ alkyl,
m is at least 2, preferably 2-100, more preferably 2-50;
p may be zero or non-zero.

In other embodiments, R$^{donor}$ may be —CO—O—R$^7$—X to provide (meth)acrylate oligomer ligands of the formula:

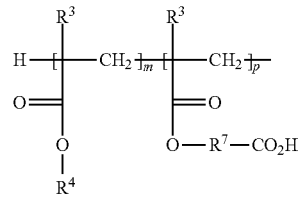

Other electron-donating X groups may be substituted for the carboxylates shown above.

Such compounds may be prepared by free-radical polymerization of one or more acrylic ester monomers, and an optional electron donor terminated acrylate monomer, such as (meth)acrylic acid and 2-(meth)acryloyloxyethyl succinic acid monomer in the presence of a thiol acid of Formula IV, and in the presence of a free-radical initiator.

Useful acrylic ester monomers include those (meth)acrylic ester of a non-tertiary alcohol, which alcohol contains from 1 to 30 carbon atoms and preferably an average of from 4 to 20 carbon atoms. A mixture of such monomers may be used.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable.

The oligomer comprises an optional electron donor functional acrylate monomer, where the electron donor may be the acid functional group, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, 2-(meth)acryloyloxyethyl succinic acid, 2-acryloyloxyethyl succinic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

The optional (meth)acrylic acid may be used in amounts such that the m is 1 to 100, p may be zero or non-zero and the ratio of m to p is at least 5:1. In some embodiments, m is 3 to 50 and p is at least one, and m>p. In some embodiments, the selection of monomers and amounts is such that the $T_g$ is less than 80° C., preferably less that 60° C., more preferably less than 50° C., as estimated by the Fox Equation.

In some embodiments it is desired that the oligomeric ligand be liquid at room temperature, and the corresponding ligand-substituted quantum dot be likewise liquid. In such instances the oligomeric ligand may be selected such that the $T_g$ is above about 20° C.

Various methods can be used to surface modify the fluorescent semiconductor nanoparticles with the ligand compounds. In some embodiments, procedures similar to those described in U.S. Pat. No. 7,160,613 (Bawendi et al.) and U.S. Pat. No. 8,283,412 (Liu et al.) can be used to add the surface modifying agent. For example, the surface modifying agent and the fluorescent semiconductor nanoparticles can be heated at an elevated temperature (e.g., at least 50° C., at least 60° C., at least 80° C., or at least 90° C.) for an extended period of time (e.g., at least 1 hour, at least 5 hours, at least 10 hours, at least 15 hours, or at least 20 hours).

If desired, any by-product of the synthesis process or any solvent used in surface-modification process can be removed, for example, by distillation, rotary evaporation, or by precipitation of the nanoparticles and centrifugation of the mixture followed by decanting the liquid and leaving behind the surface-modified nanoparticles. In some embodiments, the surface-modified fluorescent semiconductor nanoparticles are dried to a powder after surface-modification. In other embodiments, the solvent used for the surface modification is compatible (i.e., miscible) with any polymeric materials and/or precursors of the polymeric material used in compositions in which the nanoparticles are included. In these embodiments, at least a portion of the solvent used for the surface-modification reaction can be included in the solution in which the surface-modified, fluorescent semiconductor nanoparticles are dispersed.

Since InP is purified by bonding with dodecylsuccinic acid (DDSA) and lauric acid (LA) first, following by precipitation from ethanol, the precipitated quantum dots may have some of the acid functional ligands attached thereto, prior to reaction with the instant thiol-functional silicone. Similarly, CdSe quantum dots may be functionalized with amine-functional ligands as result of their preparation, prior to functionalization with the instant ligands. As result, the quantum dots may be functionalized with a combination of the instant thiol-functional silicone and carboxylic acid functional ligand or amine-functional ligand. In some embodiments the quantum dots may be additionally functionalized with ligands of the formula:
the formula:

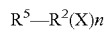

$$R^5\text{---}R^2(X)n$$

wherein
$R^5$ is (hetero)hydrocarbyl group having C2 to C30 carbon atoms;
$R^2$ is a hydrocarbyl group including alkylene, arylene, alkarylene and aralkylene;
n is at least one;
X is an electron-donating group. Such additional non-thioether ligands may be added when the functionalizing with the ligands of Formula I. Such additional ligands are generally used in amounts of 10 wt. % of less, relative to the amount of the thioether ligands.

The surface modifying agent functions at least in part to reduce the number of aggregated fluorescent semiconductor nanoparticles within the dispersion composition. The formation of aggregated fluorescent semiconductor nanoparticles can alter the fluorescent characteristics of the dispersion composition. As used herein, the term "aggregated" or "aggregation" refers to clusters or clumps of fluorescent semiconductor nanoparticles that are firmly associated with one another. Separation of aggregated particles typically requires high shear. In contrast, "agglomeration" or "agglomerated" refers to a combination or cluster of nanoparticles that is often attributable to the neutralization of electric charges. Agglomeration is typically reversible with moderate shear or by selection of a more compatible solvent.

The surface modifying agent of Formula I is added in an amount sufficient to minimize aggregation of the fluorescent semiconductor nanoparticles and to form a dispersion composition that remains in the dispersed state for a useful period of time without substantial agitation of the dispersion or that can be easily dispersed again with minimal energy input. Without wishing to be bound by theory, the surface modifying agent is believed to sterically inhibit the aggregation of the fluorescent semiconductor nanoparticles. Preferably, the surface treatment does not interfere with the fluorescence of the semiconductor nanoparticles.

Composite nanoparticles (i.e., surface-modified, fluorescent semiconductor nanoparticles) of the present disclosure can be used in conventional electronics, semiconductor devices, electrical systems, optical systems, consumer electronics, industrial or military electronics, and nanocrystal, nanowire (NW), nanorod, nanotube, and nanoribbon technologies.

The surface-modified, fluorescent semiconductor nanoparticles may be dispersed in a solution that contains (a) an optional non-aqueous solvent and (b) a polymeric binder, a precursor of the polymeric binder, or combinations thereof. Any polymeric materials that are included in the dispersion composition typically are soluble in the non-aqueous solvent and form a coating that is colorless and transparent when viewed with the human eye. Likewise, any precursors of the polymeric materials that are included in the dispersion composition are soluble in a non-aqueous solvent and form a polymeric coating that is colorless and transparent when viewed with the unaided human eye. The term transparent means transmitting at least 85% of incident light in the visible spectrum (about 400-700 nm wavelength). The term colorless means having a CIELAB b* less than about 1.5 units, preferably less than about 1.0 unit for samples with thickness of 500 microns.

The polymeric binders desirably provide barrier properties to exclude oxygen and moisture. If water and/or oxygen enter the quantum dot article, the quantum dots can degrade and ultimately fail to emit light when excited by ultraviolet or blue light irradiation. Slowing or eliminating quantum dot degradation along the laminate edges is particularly important to extend the service life of the displays in smaller electronic devices such as those utilized in, for example, handheld devices and tablets.

Exemplary polymeric materials include, but are not limited to, polysiloxanes, fluoroelastomers, polyamides, polyimides, caprolactones, caprolactams, polyurethanes, polyvinyl alcohols, polyvinyl chlorides, polyvinyl acetates, polyesters, polycarbonates, polyacrylates, polymethacrylates, polyacrylamides, and polymethacrylamides. Suitable precursors of the polymeric material (i.e., precursor materials) include any precursor materials used to prepare the polymeric materials listed above. Exemplary precursor materials include acrylates that can be polymerized to polyacrylates, methacrylates that can be polymerized to form polymethacrylates, acrylamides that can be polymerized to form polyacrylamides, methacrylamides that can be polymerized to form polymethacrylamides, epoxy resins and dicarboxylic acids that can be polymerized to form polyesters, diepoxides that can be polymerized to form polyethers, isocyanates and polyols that can be polymerized to form polyurethanes, or polyols and dicarboxylic acids that can be polymerized to form polyesters.

In some embodiments, the polymeric binder is a thermally curable epoxy-amine composition optionally further comprising a radiation-curable acrylate. Such binders are described in Applicant's U.S. Ser. No. 61/919,219 (Eckert et al.), incorporated herein by reference.

In some preferred embodiments the polymeric binder is a radiation curable oligomer having the general formula

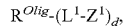

wherein
$R^{Olig}$ groups include urethanes, polyurethanes, esters, polyesters, polyethers, polyolefins, polybutadienes and epoxies;
$L^1$ is a linking group;
$Z^1$ is a pendent, free-radically polymerizable group such as (meth)acryloyl, vinyl or alkynyl and is preferably a (meth) acrylate, and
d is greater than 1, preferably at least 2.

The linking group $L^1$ between the oligomer segment and ethylenically unsaturated end group includes a divalent or higher valency group selected from an alkylene, arylene, heteroalkylene, or combinations thereof and an optional divalent group selected from carbonyl, ester, amide, sulfonamide, or combinations thereof. $L^1$ can be unsubstituted or substituted with an alkyl, aryl, halo, or combinations thereof. The $L^1$ group typically has no more than 30 carbon atoms. In some compounds, the $L^1$ group has no more than 20 carbon atoms, no more than 10 carbon atoms, no more than 6 carbon atoms, or no more than 4 carbon atoms. For example, $L^1$ can be an alkylene, an alkylene substituted with an aryl group, or an alkylene in combination with an arylene or an alkyl ether or alkyl thioether linking group.

The pendent, free radically polymerizable functional groups $Z^1$ may be selected from the group consisting of vinyl, vinyl ether, ethynyl, and (meth)acyroyl which includes acrylate, methacrylate, acrylamide and methacrylamide groups.

The oligomeric group $R^{olig}$ may be selected from poly (meth)acrylate, polyurethane, polyepoxide, polyester, polyether, polysulfide, polybutadiene, hydrogenated polyolefins (including hydrogenated polybutadienes, isoprenes and ethylene/propylene copolymers, and polycarbonate oligomeric chains.

As used herein, "(meth)acrylated oligomer" means a polymer molecule having at least two pendent (meth)acryloyl groups and a weight average molecular weight ($M_w$) as determined by Gel Permeation Chromatography of at least 1,000 g/mole and typically less than 50,000 g/mole.

(Meth)acryloyl epoxy oligomers are multifunctional (meth)acrylate esters and amides of epoxy resins, such as the (meth)acrylated esters of bisphenol-A epoxy resin. Examples of commercially available (meth)acrylated epoxies include those known by the trade designations EBECRYL 600 (bisphenol A epoxy diacrylate of 525 molecular weight), EBECRYL 605 (EBECRYL 600 with 25% tripropylene glycol diacrylate), EBECRYL 3700 (bisphenol-A diacrylate of 524 molecular weight) and EBECRYL 3720H (bisphenol A diacrylate of 524 molecular weight with 20% hexanediol diacrylate) available from Cytec Industries, Inc., Woodland Park, N.J.; and PHOTOMER 3016 (bisphenol A epoxy acrylate), PHOTOMER 3016-40R (epoxy acrylate and 40% tripropylene glycol diacrylate blend), and PHOTOMER 3072 (modified bisphenol A acrylate, etc.) available from BASF Corp., Cincinnati, Ohio, and Ebecryl 3708 (modified bisphenol A epoxy diacrylate) available from Cytec Industries, Inc., Woodland Park, N.J.

(Meth)acrylated urethanes are multifunctional (meth) acrylate esters of hydroxy terminated isocyanate extended polyols, polyesters or polyethers. (Meth)acrylated urethane oligomers can be synthesized, for example, by reacting a diisocyanate or other polyvalent isocyanate compound with a polyvalent polyol (including polyether and polyester polyols) to yield an isocyanate terminated urethane prepolymer. A polyester polyol can be formed by reacting a polybasic acid (e.g., terephthalic acid or maleic acid) with a polyhydric alcohol (e.g., ethylene glycol or 1,6-hexanediol). A polyether polyol useful for making the acrylate functionalized urethane oligomer can be chosen from, for example, polyethylene glycol, polypropylene glycol, poly(tetrahydrofuran), poly(2-methyl-tetrahydrofuran), poly(3-methyl-tetrahydrofuran) and the like. Alternatively, the polyol linkage of an acrylated urethane oligomer can be a polycarbonate polyol.

Subsequently, (meth)acrylates having a hydroxyl group can then be reacted with the terminal isocyanate groups of the prepolymer. Both aromatic and the preferred aliphatic isocyanates can be used to react with the urethane to obtain the oligomer. Examples of diisocyanates useful for making the (meth)acrylated oligomers are 2,4-tolylene diisocyanate, 2,6-tolylene diisocyanate, 1,3-xylylene diisocyanate, 1,4-xylylene diisocyanate, 1,6-hexane diisocyanate, isophorone diisocyanate and the like. Examples of hydroxy terminated acrylates useful for making the acrylated oligomers include, but are not limited to, 2-hydroxyethyl (meth)acrylate, 2-hydroxypropyl (meth)acrylate, α-hydroxybutyl acrylate, polyethylene glycol (meth)acrylate and the like.

A (meth)acrylated urethane oligomer can be, for example, any urethane oligomer having at least two acrylate functionalities and generally less than about six functionalities. Suitable (meth)acrylated urethane oligomers are also commercially available such as, for example, those known by the trade designations PHOTOMER 6008, 6019, 6184 (aliphatic urethane triacrylates) available from Henkel Corp.; EBECRYL 220 (hexafunctional aromatic urethane acrylate of 1000 molecular weight), EBECRYL 284 (aliphatic urethane diacrylate of 1200 molecular weight diluted with 12% of 1,6-hexanediol diacrylate), EBECRYL 4830 (aliphatic urethane diacrylate of 1200 molecular weight diluted with 10% of tetraethylene glycol diacrylate), and EBECRYL 6602 (trifunctional aromatic urethane acrylate of 1300 molecular weight diluted with 40% of trimethylolpropane ethoxy triacrylate), available from UCB Chemical; and SARTOMER CN1963, 963E75, 945A60, 963B80, 968, and 983) available from Sartomer Co., Exton, Pa.

Properties of these materials may be varied depending upon selection of the type of isocyanate, the type of polyol modifier, the reactive functionality and molecular weight. Diisocyanates are widely used in urethane acrylate synthesis and can be divided into aromatic and aliphatic diisocyanates. Aromatic diisocyanates are used for manufacture of aromatic urethane acrylates which have significantly lower cost than aliphatic urethane acrylates but tend to noticeably yellow on white or light colored substrates. Aliphatic urethane acrylates include aliphatic diisocyanates that exhibit slightly more flexibility than aromatic urethane acrylates that include the same functionality, a similar polyol modifier and at similar molecular weight.

The curable composition may comprise a functionalized poly(meth)acrylate oligomer, which may be obtained from the reaction product of: (a) from 50 to 99 parts by weight of (meth)acrylate ester monomer units that are homo- or co-polymerizable to a polymer (b) from 1 to 50 parts by weight of monomer units having a pendent, free-radically polymerizable functional group. Examples of such materials are available from Lucite International (Cordova, Tenn.) under the trade designations of Elvacite 1010, Elvacite 4026, and Elvacite 4059.

The (meth)acrylated poly(meth)acrylate oligomer may comprise a blend of an acrylic or hydrocarbon polymer with multifunctional (meth)acrylate diluents. Suitable polymer/diluent blends include, for example, commercially available products such as EBECRYL 303, 745 and 1710 all of which are available from Cytec Industries, Inc., Woodland Park, N.J.

The curable composition may comprise a (meth)acrylated polybutadiene oligomer, which may be obtained from a carboxyl- or hydroxyl-functionalized polybutadiene. By carboxyl or hydroxy functionalised polybutadiene is meant to designate a polybutadiene comprising free —OH or —COOH groups. Carboxyl functionalized polybutadienes are known, they have for example been described in U.S. Pat. No. 3,705,208 (Nakamuta et al.) and are commercially available under the trade name of Nisso PB C-1000 (Nisso America, New York, N.Y.). Carboxyl functionalized polybutadienes can also be obtained by the reaction of a hydroxyl functionalized polybutadiene (that is a polybutadiene having free hydroxyl groups) with a cyclic anhydride such as for example has been described in U.S. Pat. No. 5,587,433 (Boeckeler), U.S. Pat. No. 4,857,434 (Klinger) and U.S. Pat. No. 5,462,835 (Mirle).

Carboxyl and hydroxyl functionalized polybutadienes suitable for being used in the process according to the present invention contain besides the carboxyl and/or hydroxyl groups, units derived from the polymerization of butadiene. The polybutadiene (PDB) generally comprises 1-4 cis units/1-4 trans units/1-2 units in a ratio a/b/c where a, b and c range from 0 to 1 with a+b+c=1. The number average molecular weight ($M_n$) of the functionalized polybutadiene is preferably from 200 to 10000 Da. The $M_n$ is more preferably at least 1000. The $M_n$ more preferably does not exceed 5000 Da. The —COOH or —OH functionality is generally from 1.5 to 9, preferably from 1.8 to 6.

Exemplary hydroxyl and carboxyl polybutadienes include without limitation Poly BD R-20LM (hydroxyl functionalized PDB, a=0.2, b=0.6, c=0.2, $M_n$ 1230) and Poly BD R45-HT (hydroxyl functionalized PDB, a=0.2, b=0.6, c=0.2, $M_n$ 2800) commercialized by Atofina, Nisso-PB G-1000 (hydroxyl functionalized PDB, a=0, b<0.15, c>0.85, $M_n$ 1250-1650), Nisso-PB G-2000 (hydroxyl functionalized PDB, a=0, b<0.15, c>0.85, $M_n$ 1800-2200), Nisso-PB G-3000 (hydroxyl functionalized PDB, a=0, b<0.10, c>0.90, $M_n$ 2600-3200), Nisso-PB C-1000 (carboxyl functionalized PDB, a=0, b<0.15, c>0.85, Mn 1200-1550) obtainable from Nisso America, New York, N.Y.

When carboxyl functionalized polybutadienes obtained from the reaction of a hydroxyl functionalized polybutadiene with a cyclic anhydride are used, this cyclic anhydride preferably include phthalic anhydride, hexahydrophthalic anhydride, glutaric anhydride, succinic anhydride, dodecenylsuccinic anhydride, maleic anhydride, trimellitic anhydride, pyromellitic anhydride. Mixtures of anhydrides can also be used. The amount of anhydride used for the preparation of a carboxyl functionalized polybutadiene from a hydroxyl functionalized polybutadiene is generally at least 0.8 molar, preferably at least 0.9 molar and more preferably at least 0.95 molar equivalent per molar equivalents of —OH groups present in the polybutadiene.

A (meth)acrylated polybutadiene oligomer which is the reaction product of a carboxyl functionalized polybutadiene may be prepared with a (meth)acrylated monoepoxide. (Meth)acrylated mono-epoxides are known. Examples of (meth)acrylated mono-epoxides that can be used are glycidyl (meth)acrylate esters, such as glycidylacrylate, glycidylmethacrylate, 4-hydroxybutylacrylate glycidylether, bisphenol-A diglycidylether monoacrylate. The (meth)acrylated mono-epoxides are preferably chosen from glycidylacrylate and glycidylmethacrylate. Alternatively, a (meth)acrylated polybutadiene oligomer which is the reaction product of a hydroxyl functionalized polybutadiene may be prepared with a (meth)acrylate ester, or halide.

Some (meth)acrylated polybutadienes that can be used, for example, include Ricacryl 3100 and Ricacryl 3500, manufactured by Sartomer Company, Exton, Pa., USA, and Nisso TE-2000 available from Nisso America, New York, N.Y. Alternatively, other methacrylated polybutadienes can be used. These include dimethacrylates of liquid polybutadiene resins composed of modified, esterified liquid polybutadiene diols. These are available under the tradename CN301 and CN303, and CN307, manufactured by Sartomer Company, Exton, Pa., USA. Regardless which methacrylated polybutadiene is used with embodiments of the invention, the methacrylated polybutadiene can include a number of methacrylate groups per chain from about 2 to about 20.

Alternatively, the acrylate functionalized oligomers can be polyester acrylate oligomers, acrylated acrylic oligomers, polycarbonate acrylate oligomers or polyether acrylate oligomers. Useful polyester acrylate oligomers include CN293, CN294, and CN2250, 2281, 2900 from Sartomer Co. (Exton, Pa.) and EBECRYL 80, 657, 830, and 1810 from UCB Chemicals (Smyrna, Ga.). Suitable polyether acrylate oligomers include CN501, 502, and 551 from Sartomer Co. (Exton, Pa.). Useful polycarbonate acrylate oligomers can be prepared according to U.S. Pat. No. 6,451,958 (Sartomer Technology Company Inc., Wilmington, Del.).

In each embodiment comprising a (meth)acrylated oligomer, the curable binder composition optionally, yet preferably, comprises diluent monomer in an amount sufficient to reduce the viscosity of the curable composition such that it may be coated on a substrate. Generally, the composition may comprise up to about 70 wt-% diluent monomers to reduce the viscosity of the oligomeric component to less than 10000 centipoise and to improve the processability.

Useful monomers are desirably soluble or miscible in the (meth)acrylated oligomer, highly polymerizable therewith. Useful diluents are mono- and polyethylenically unsaturated monomers such as (meth)acrylates or (meth)acrylamides.

Suitable monomers typically have a number average molecular weight no greater than 450 g/mole. The diluent monomer desirably has minimal absorbance at the wavelength of the radiation used to cure the composition. Such diluent monomers may include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethyleneglycol-monomethacrylate, laurylacrylate, tetrahydrofurfurylacrylate, ethoxy-ethoxyethyl acrylate and ethoxylated-nonylacrylate. Especially preferred are 2-ethyl-hexylacrylate, ethoxy-ethoxyethyl acrylate, tridecylacrylate and ethoxylated nonylacrylate. High $T_g$ monomers having one ethylenically unsaturated group and a glass transition temperature of the corresponding homopolymer of 50° C. or more which are suitable in the present invention, include, for example, N-vinylpyrrolidone, N-vinyl caprolactam, isobornyl acrylate, acryloylmorpholine, isobornylmethacrylate, phenoxyethylacrylate, phenoxyethylmethacrylate, methylmethacrylate and acrylamide.

Furthermore, the diluent monomers may contain an average of two or more free-radically polymerizable groups. A diluent having three or more of such reactive groups can be present as well. Examples of such monomers include: $C_2$-$C_{18}$ alkylenedioldi(meth)acrylates, $C_3$-$C_{18}$ alkylenetrioltri(meth)acrylates, the polyether analogues thereof, and the like, such as 1,6-hexanedioldi(meth)acrylate, trimethylolpropanetri(meth)acrylate, triethyleneglycoldi(meth)acrylate, pentaeritritoltri(meth)acrylate, and tripropyleneglycol di(meth)acrylate, and di-trimethylolpropane tetraacrylate.

Suitable preferred diluent monomers include for example benzyl (meth)acrylate, phenoxyethyl (meth)acrylate; phenoxy-2-methylethyl (meth)acrylate; phenoxyethoxyethyl (meth)acrylate, 1-naphthyloxy ethyl acrylate; 2-naphthyloxy ethyl acrylate; phenoxy 2-methylethyl acrylate; phenoxy-ethoxyethyl acrylate; 2-phenylphenoxy ethyl acrylate; 4-phenylphenoxy ethyl acrylate; and phenyl acrylate.

The inclusion of only one diluent is preferred for ease in manufacturing. Preferred diluent monomers includes phenoxyethyl (meth)acrylate, and benzyl (meth)acrylate. Phenoxyethyl acrylate is commercially available from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from Osaka Organic Chemical, Osaka City, Japan.

Such optional monomer(s) may be present in the polymerizable composition in amount of at least about 5 wt-%. The optional monomer(s) typically total no more than about 70 wt-% of the curable composition. The some embodiments the total amount of diluent monomer ranges from about 10 wt-% to about 50-%.

The quantum dot layer can have any useful amount of quantum dots, and in some embodiments the quantum dot layer can include from 0.1 wt % to 1 wt % quantum dots, based on the total weight of the quantum dot layer (dots and polymeric binder). The dispersion composition can also contain a surfactant (i.e., leveling agent), a polymerization initiator, and other additives, as known in the art.

The dispersion composition may also include a non-aqueous solvent. As used herein, the term "non-aqueous" means that no water is purposefully added to the compositions. However, a small amount of water might be present as an impurity in other components or might be present as a reaction by-product of a surface modification process or the polymerization process. The non-aqueous solvents are typically selected to be compatible (i.e., miscible) with the surface modifying agent added to the surface of the fluorescent semiconductor nanoparticles. Suitable non-aqueous solvents include, but are not limited to, aromatic hydrocarbons (e.g., toluene, benzene, or xylene), aliphatic hydrocarbons such as alkanes (e.g., cyclohexane, heptane, hexane, or octane), alcohols (e.g., methanol, ethanol, isopropanol, or butanol), ketones (e.g., acetone, methyl ethyl ketone, methyl isobutyl ketone, or cyclohexanone), aldehydes, amines, amides, esters (e.g., amyl acetate, ethylene carbonate, propylene carbonate, or methoxypropyl acetate), glycols (e.g., ethylene glycol, propylene glycol, butylene glycol, triethylene glycol, diethylene glycol, heylene glycol, or glycol ethers such as those commercially available from Dow Chemical, Midland, Mich. under the trade designation DOWANOL), ethers (e.g., diethyl ether), dimethyl sulfoxide, tetramethylsulfone, halocarbons (e.g., methylene chloride, chloroform, or hydrofluoroethers), or combinations thereof.

Generally, the ligand-functional quantum dots, the polymeric binder and optional solvent are combined and subject to high shear mixing to produce a dispersion of the ligand functional quantum dots in the polymer matrix. The matrix is chosen such there is limited compatibility and the quantum dots form a separate, non-aggregating phase in the matrix. The dispersion is then coated and cured either thermally, free-radically, or both to lock in the dispersed structure and exclude oxygen and water from the dispersed quantum dots.

When using a free-radically curable polymeric binder, the curable composition further comprises photoinitiators, in an amount between the range of about 0.1% and about 5% by weight.

Useful photoinitiators include those known as useful for photocuring free-radically polyfunctional (meth)acrylates. Exemplary photoinitiators include benzoin and its derivatives such as alpha-methylbenzoin; alpha-phenylbenzoin; alpha-allylbenzoin; alpha-benzylbenzoin; benzoin ethers such as benzil dimethyl ketal (e.g., "IRGACURE 651" from BASF, Florham Park, N.J.), benzoin methyl ether, benzoin ethyl ether, benzoin n-butyl ether; acetophenone and its derivatives such as 2-hydroxy-2-methyl-1-phenyl-1-propanone (e.g., "DAROCUR 1173" from BASF, Florham Park, N.J.) and 1-hydroxycyclohexyl phenyl ketone (e.g., "IRGACURE 184" from BASF, Florham Park, N.J.); 2-methyl-1-[4-(methylthio)phenyl]-2-(4-morpholinyl)-1-propanone (e.g., "IRGACURE 907" from BASF, Florham Park, N.J.); 2-benzyl-2-(dimethylamino)-1-[4-(4-morpholinyl)phenyl]-1-butanone (e.g., "IRGACURE-369" from BASF, Florham Park, N.J.) and phosphine oxide derivatives such as Ethyl-2,4,6-trimethylbenzoylphenylphoshinate (e.g. "TPO-L" from BASF, Florham Park, N.J.), and Irgacure 819 (phenylbis(2,4,6-trimethylbenzoyl)phosphine oxide) available from BASF, Florham Park, N.J.

Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(etas-2,4-cyclopentadien-1-yl)-bis[2,6-difluoro-3-(1H-pyrrol-1-yl) phenyl]titanium (e.g., "CGI 784DC" from BASF, Florham Park, N.J.); halomethyl-nitrobenzenes (e.g., 4-bromomethylnitrobenzene), mono- and bis-acylphosphines (e.g., "IRGACURE 1700", "IRGACURE 1800", "IRGACURE 1850", and "DAROCUR 4265").

The curable composition may be irradiated with activating UV or visible radiation to polymerize the components preferably in the wavelengths of 250 to 500 nanometers. UV light sources can be of two types: 1) relatively low light intensity sources such as blacklights that provide generally 10 mW/cm² or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium- and high-pressure mercury arc lamps, electrodeless mercury lamps, light emitting diodes, mercury-xenon lamps, lasers and the like, which provide intensities generally between 10 and 5000 mW/cm² in the wavelength rages of 320-390 nm (as measured in accordance with procedures approved by the United States National Institute of Standards and Technology as, for example, with a PowerPuck™ radiometer manufactured by Electronic Instrumentation & Technology, Inc., in Sterling, Va.).

Referring to FIG. 1, quantum dot article 10 includes a first barrier layer 32, a second barrier layer 34, and a quantum dot layer 20 between the first barrier layer 32 and the second barrier layer 34. The quantum dot layer 20 includes a plurality of quantum dots 22 dispersed in a matrix 24.

The barrier layers 32, 34 can be formed of any useful material that can protect the quantum dots 22 from exposure to environmental contaminates such as, for example, oxygen, water, and water vapor. Suitable barrier layers 32, 34 include, but are not limited to, films of polymers, glass and dielectric materials. In some embodiments, suitable materials for the barrier layers 32, 34 include, for example, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof.

More particularly, barrier films can be selected from a variety of constructions. Barrier films are typically selected such that they have oxygen and water transmission rates at a specified level as required by the application. In some embodiments, the barrier film has a water vapor transmission rate (WVTR) less than about 0.005 g/m²/day at 38° C. and 100% relative humidity; in some embodiments, less than about 0.0005 g/m²/day at 38° C. and 100% relative humidity; and in some embodiments, less than about 0.00005 g/m²/day at 38° C. and 100% relative humidity. In some embodiments, the flexible barrier film has a WVTR of less than about 0.05, 0.005, 0.0005, or 0.00005 g/m²/day at 50° C. and 100% relative humidity or even less than about 0.005, 0.0005, 0.00005 g/m²/day at 85° C. and 100% relative humidity. In some embodiments, the barrier film has an oxygen transmission rate of less than about 0.005 g/m²/day at 23° C. and 90% relative humidity; in some embodiments, less than about 0.0005 g/m²/day at 23° C. and 90% relative humidity; and in some embodiments, less than about 0.00005 g/m²/day at 23° C. and 90% relative humidity.

Exemplary useful barrier films include inorganic films prepared by atomic layer deposition, thermal evaporation, sputtering, and chemical vapor deposition. Useful barrier films are typically flexible and transparent. In some embodiments, useful barrier films comprise inorganic/organic. Flexible ultra-barrier films comprising inorganic/organic multilayers are described, for example, in U.S. Pat. No. 7,018,713 (Padiyath et al.). Such flexible ultra-barrier films may have a first polymer layer disposed on polymeric film substrate that is overcoated with two or more inorganic barrier layers separated by at least one second polymer layer. In some embodiments, the barrier film comprises one inorganic barrier layer interposed between the first polymer layer disposed on the polymeric film substrate and a second polymer layer 224.

In some embodiments, each barrier layer 32, 34 of the quantum dot article 10 includes at least two sub-layers of different materials or compositions. In some embodiments, such a multi-layered barrier construction can more effectively reduce or eliminate pinhole defect alignment in the barrier layers 32, 34, providing a more effective shield against oxygen and moisture penetration into the matrix 24. The quantum dot article 10 can include any suitable material or combination of barrier materials and any suitable number of barrier layers or sub-layers on either or both sides of the quantum dot layer 20. The materials, thickness, and number of barrier layers and sub-layers will depend on the particular application, and will suitably be chosen to maximize barrier protection and brightness of the quantum dots 22 while minimizing the thickness of the quantum dot article 10. In some embodiments each barrier layer 32, 34 is itself a laminate film, such as a dual laminate film, where each barrier film layer is sufficiently thick to eliminate wrinkling in roll-to-roll or laminate manufacturing processes. In one illustrative embodiment, the barrier layers 32, 34 are polyester films (e.g., PET) having an oxide layer on an exposed surface thereof.

The quantum dot layer 20 can include one or more populations of quantum dots or quantum dot materials 22. Exemplary quantum dots or quantum dot materials 22 emit green light and red light upon down-conversion of blue primary light from a blue LED to secondary light emitted by the quantum dots. The respective portions of red, green, and blue light can be controlled to achieve a desired white point for the white light emitted by a display device incorporating the quantum dot article 10. Exemplary quantum dots 22 for use in the quantum dot articles 10 include, but are not limited to, CdSe with ZnS shells. Suitable quantum dots for use in quantum dot articles described herein include, but are not limited to, core/shell luminescent nanocrystals including CdSe/ZnS, InP/ZnS, PbSe/PbS, CdSe/CdS, CdTe/CdS or CdTe/ZnS. In exemplary embodiments, the luminescent nanocrystals include an outer ligand coating and are dispersed in a polymeric matrix. Quantum dot and quantum dot materials 22 are commercially available from, for example, Nanosys Inc., Milpitas, Calif. The quantum dot layer 20 can have any useful amount of quantum dots 22, and in some embodiments the quantum dot layer 20 can include from 0.1 wt % to 1 wt % quantum dots, based on the total weight of the quantum dot layer 20.

In some embodiments, the quantum dot materials can include quantum dots dispersed in a liquid carrier. For example, the liquid carrier can include an oil such as an amino-silicone oil.

In one or more embodiments the quantum dot layer 20 can optionally include scattering beads or particles. These scattering beads or particles have a refractive index that differs from the refractive index of the matrix material 24 by at least 0.05, or by at least 0.1. These scattering beads or particles can include, for example, polymers such as silicone, acrylic, nylon, and the like, or inorganic materials such as $TiO_2$, $SiO_x$, $AlO_x$, and the like, and combinations thereof. In some embodiments, including scattering particles in the quantum dot layer 20 can increase the optical path length through the quantum dot layer 20 and improve quantum dot absorption and efficiency. In many embodiments, the scattering beads or particles have an average particle size from 1 to 10 micrometers, or from 2 to 6 micrometers. In some embodiments, the quantum dot material 20 can optionally include fillers such fumed silica.

In some preferred embodiments, the scattering beads or particles are Tospearl™ 120A, 130A, 145A and 2000B spherical silicone resins available in 2.0, 3.0, 4.5 and 6.0 micron particle sizes respectively from Momentive Specialty Chemicals Inc., Columbus, Ohio.

The matrix 24 of the quantum dot layer 20 can be formed from an polymeric binder or binder precursor that adheres to the materials forming the barrier layers 32, 34 to form a laminate construction, and also forms a protective matrix for the quantum dots 22. In one embodiment, the matrix 24 is formed by curing or hardening an adhesive composition including an epoxy amine polymer and an optional radiation-curable methacrylate compound.

Figure 2:
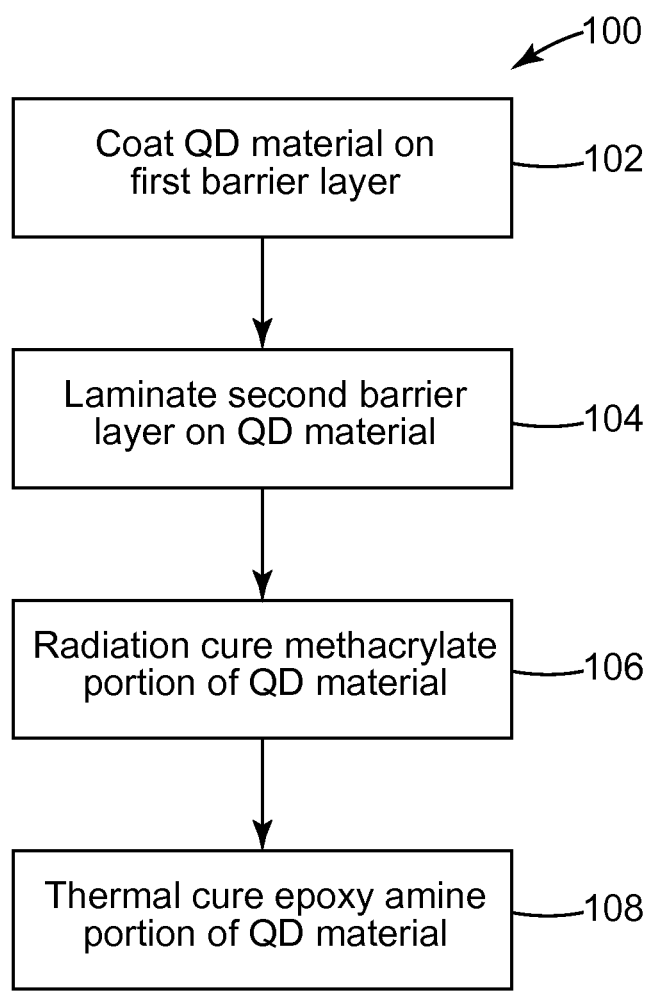
FIG. 2 is a flow diagram of an illustrative method of forming a quantum dot film.

Referring to FIG. 2, in another aspect, the present disclosure is directed to a method of forming a quantum dot film article 100 including coating an adhesive composition including quantum dots on a first barrier layer 102 and disposing a second barrier layer on the quantum dot material 104. In some embodiments, the method 100 includes polymerizing (e.g., radiation curing) the radiation curable methacrylate compound to form a partially cured quantum dot material 106 and polymerizing the binder composition to form a cured matrix 108.

In some embodiments, the binder composition can be cured or hardened by heating. In other embodiments, the adhesive composition may also be cured or hardened by applying radiation such as, for example, ultraviolet (UV) light. Curing or hardening steps may include UV curing, heating, or both. In some example embodiments that are not intended to be limiting, UV cure conditions can include applying about 10 mJ/cm$^2$ to about 4000 mJ/cm$^2$ of UVA, more preferably about 10 mJ/cm$^2$ to about 200 mJ/cm$^2$ of UVA. Heating and UV light may also be applied alone or in combination to increase the viscosity of the binder composition, which can allow easier handling on coating and processing lines.

In some embodiments, the binder composition may be cured after lamination between the overlying barrier films 32, 34. Thus, the increase in viscosity of the binder composition locks in the coating quality right after lamination. By curing right after coating or laminating, in some embodiments the cured binder increases in viscosity to a point that the binder composition acts as a pressure sensitive adhesive (PSA) to hold the laminate together during the cure and greatly reduces defects during the cure. In some embodiments, the radiation cure of the binder provides greater control over coating, curing and web handling as compared to traditional thermal curing.

Once at least partially cured, the binder composition forms polymer network that provides a protective supporting matrix 24 for the quantum dots 22.

Ingress, including edge ingress, is defined by a loss in quantum dot performance due to ingress of moisture and/or oxygen into the matrix 24. In various embodiments, the edge ingress of moisture and oxygen into the cured matrix 24 is less than about 1.25 mm after 1 week at 85° C., or about less than 0.75 mm after 1 week at 85° C., or less than about 0.5 mm after 1 week at 85° C. In various embodiments, oxygen permeation into the cured matrix is less than about 80 (cc·mil)/(m$^2$ day), or less than about 50 (cc·mil)/(m$^2$ day). In various embodiments, the water vapor transmission rate of the cured matrix should be less than about 15 (20 g/m$^2$·mil·day), or less than about 10 (20 g/m$^2$·mil·day).

In various embodiments, the thickness of the quantum dot layer 20 is about 80 microns to about 250 microns.

Figure 3:
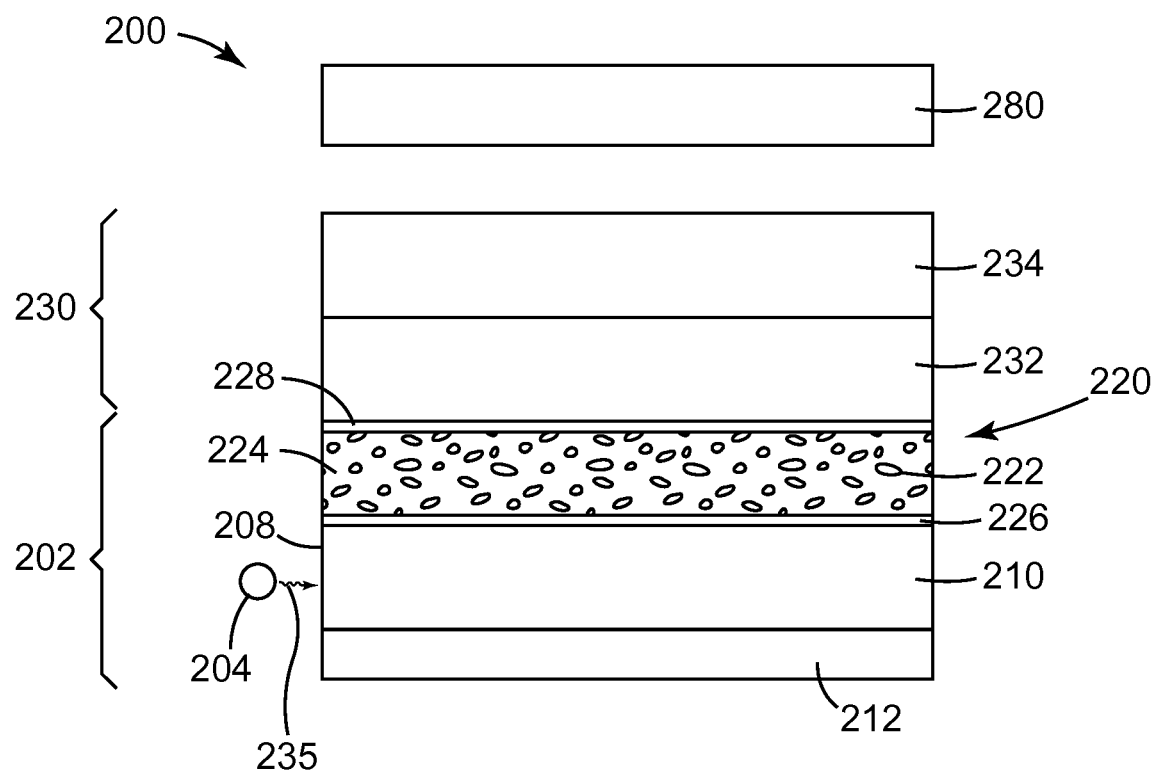
FIG. 3 is a schematic illustration of an embodiment of a display including a quantum dot article.

FIG. 3 is a schematic illustration of an embodiment of a display device 200 including the quantum dot articles described herein. This illustration is merely provided as an example and is not intended to be limiting. The display device 200 includes a backlight 202 with a light source 204 such as, for example, a light emitting diode (LED). The light source 204 emits light along an emission axis 235. The light source 204 (for example, a LED light source) emits light through an input edge 208 into a hollow light recycling cavity 210 having a back reflector 212 thereon. The back reflector 212 can be predominately specular, diffuse or a combination thereof, and is preferably highly reflective. The backlight 202 further includes a quantum dot article 220, which includes a protective matrix 224 having dispersed therein quantum dots 222. The protective matrix 224 is bounded on both surfaces by polymeric barrier films 226, 228, which may include a single layer or multiple layers.

The display device 200 further includes a front reflector 230 that includes multiple directional recycling films or layers, which are optical films with a surface structure that redirects off-axis light in a direction closer to the axis of the display, which can increase the amount of light propagating on-axis through the display device, this increasing the brightness and contrast of the image seen by a viewer. The front reflector 230 can also include other types of optical films such as polarizers. In one non-limiting example, the front reflector 230 can include one or more prismatic films 232 and/or gain diffusers. The prismatic films 232 may have prisms elongated along an axis, which may be oriented parallel or perpendicular to an emission axis 235 of the light source 204. In some embodiments, the prism axes of the prismatic films may be crossed. The front reflector 230 may further include one or more polarizing films 234, which may include multilayer optical polarizing films, diffusely reflecting polarizing films, and the like. The light emitted by the front reflector 230 enters a liquid crystal (LC) panel 280. Numerous examples of backlighting structures and films may be found in, for example, U.S. Publication No. US 2011/0051047.

Various composite particles are provided.

Embodiment 1 is a composite particle comprising: a fluorescent semiconductor core/shell nanoparticle; and the thioether ligand of Formula I attached to the core/shell nanoparticle outer surface Embodiment 2 is the composite particle of embodiment 1 wherein the core comprises a first semiconductor material and the shell comprises a second semiconductor material that is different than the first semiconductor material.

Embodiment 3 is the composite particle of embodiment 1 or 2 wherein the core comprises a metal phosphide or a metal selenide.

Embodiment 4 is the composite particle of embodiment 3 wherein the core comprises InP or CdSe.

Embodiment 5 is the composite particle of any of embodiments 1 through 4 wherein the shell comprises a zinc-containing compound.

Embodiment 6 is the composite particle of any of embodiments 1 through 5 wherein the shell is a multilayered shell.

Embodiment 7 is the composite particle of embodiment 6 wherein the multilayered shell comprises an inner shell overcoating the core, wherein the inner shell comprises zinc selenide and zinc sulfide.

Embodiment 8 is the composite particle of embodiment 7 wherein the multilayered shell comprises an outer shell overcoating the inner shell, wherein the outer shell comprises zinc sulfide.

Embodiment 9 is the composite particle of any of embodiments 1 through 8 wherein the thioether ligand of Formula I is soluble in a nonpolar organic solvent at room temperature in an amount of at least 1 wt-%.

Embodiment 10 is the composite particle comprising: a fluorescent semiconductor core/shell nanoparticle comprising: an InP core; an inner shell overcoating the core, wherein the inner shell comprises zinc selenide and zinc sulfide; and an outer shell overcoating the inner shell, wherein the outer shell comprises zinc sulfide; and a thioether ligand of Formula I attached to the core/shell nanoparticle outer surface.

Various quantum dot articles are further provided;

Embodiment 11 is a quantum dot film article comprising:
a first barrier layer;
a second barrier layer; and
a quantum dot layer between the first barrier layer and the second barrier layer, the quantum dot layer comprising quantum dots dispersed in a binder matrix.

Embodiment 12 is the article of embodiment 11 wherein the binder matrix comprises a cured composition, wherein the composition comprises an epoxide, and an amino-functional compound, and a radiation curable methacrylate compound Embodiment 13 is the article of any one of embodiments 11-12, wherein the bindercomposition further comprises a photoinitator.

Embodiment 14 is the article of any one of embodiments 11-13, wherein the matrix comprises about 5 wt % to about 25 wt % of the methacrylate compound and 70 to 90 wt % of an epoxy polymer formed from the reaction of the epoxide and the amino-functional compound.

Embodiment 15 is the article of any one of embodiments 11-14, wherein the matrix further comprises scattering particles having an average size in a range from 1 to 10 micrometers.

Embodiment 16 is the film article of any one of embodiments 11-15, wherein at least one of the first and the second barrier layer comprises at least one polymeric film.

Embodiment 17 is a display device comprising the film article of any one of embodiments 11-16.

Embodiment 18 is a method of forming a article, comprising coating a quantum dot material on a first polymeric film, the quantum dot material comprising quantum dots in an binder composition comprising an epoxide, an amino-functional compound; a radiation curable methacrylate compound, and a photoinitiator.

Embodiment 19 is the method of embodiment 18, further comprising curing the binder composition.

Embodiment 20 is the method of embodiment 19, further comprising applying a second polymeric film on the binder composition.

The following examples are provided to further illustrate the present invention and are not intended to limit the invention in any manner.

EXAMPLES

As used in the examples, all weights and percentages are by weight unless otherwise specified. All materials not specifically listed in the following table can be obtained from a supplier of chemicals such as Aldrich Chemical Company (Milwaukee, Wis., USA).

Materials

"QD-1", InP/SeS—ZnS core-shell quantum dot (QD) particles in octadecene (ODE) (Lot No#334-20; QY=61.8%; FWHM=44.3 nm; Abs=507.3 nm; Emission @ 538.4 nm; $OD_{460}$=6.9 mg/ml), obtained from Nanosys, Inc., Milpitas, Calif.

"QD-2", InP/SeS—ZnS QD core-shell quantum dot in toluene (Lot#321-93-3, reported QY=51.8%; FWHM=40.7 nm; Abs @ 493.6 nm; Emission @ 527.4 nm; OD (460 nm)=10.4), obtained from Nanosys, Inc., Milpitas, Calif.

"DDSA", dodecenyl succinic anhydride, was obtained from Nanosys, Inc., Milpitas, Calif.

Mercaptosuccinic acid, 3-Mercaptopropionic acid, 1-Dodecene (n-$C_{10}H_{21}CH=CH_2$), Octadecyl acrylate, Mono-2-(methacryloyloxy) ethyl succinate ($CH_2=CMeCO_2CH_2CH_2OC(O)CH_2CH_2CO_2H$, CAS#20882-04-6) were obtained from Aldrich Chemical Company, Milwaukee, Wis.

n-Lauryl acrylate, was obtained from Pfaltz Bauer, Inc., Waterbury, Conn.

n-Dodecyl methacrylate, obtained from Avocado Research Chemicals, Inc., Heysham, Lancashire, UK.

2-Ethylhexyl methacrylate, Methacrylic acid obtained from Alfa Aesar, Ward Hill, Mass.

2-Ethylhexyl acrylate, obtained from Celanese Ltd., Irving, Tex.

Succinic acid monoacryloyloxyethyl ester (CAS#50940-49-3, $CH_2=CHCO_2CH_2CH_2OC(O)CH_2CH_2CO_2H$), obtained from TCI-America, Seekonk, Mass.

"VAZO-67" was obtained from E. I. du Pont de Nemours and Company, Wilmington, Del., under trade designation "VAZO-67".

Preparative Examples 1-9

PE1-PE9

Preparation of Mercaptosuccinic Acid Derivatives

Preparative Example 1

PE1

Preparation of n-$C_{12}H_{25}$—S—$CH(CO_2H)CH_2CO_2H$

PE1 was prepared from mercaptosuccinic acid and 1-dodecene according to the process described in J. Am. Oil Chem. Soc. 72 (7), 805, 1995, by Katsuhisa Kamio et. al.

Preparative Example 2

PE2

Preparation of H—[$CH(CO_2C_{12}H_{25-n})CH_2$]$_3$—S—$CH(CO_2H)CH_2CO_2H$

In a 8 Oz (0.24 L) bottle, charged with 5.02 g mercaptosuccinic acid (MW=150.15, 33.4 mmol), 24.04 g lauryl acrylate (MW=240.39, 100 mmol) and 70 g ethyl acetate. The solution was bubbled with $N_2$ for 2 minutes, then added 0.67 g VAZO-67. After sealing the bottle, the solution was polymerized in a 70° C. oil bath for 24 hours with a magnetic stirring, which forms a homogeneous solution. The solvent was striped out by vacuum rotary evaporation to give a liquid oligomer, which was confirmed by FT-IR analysis (without —SH and acrylate signal).

Preparative Example 3

PE3

Preparation of H—[CH(CO$_2$C$_{12}$H$_{25-n}$)CH$_2$]$_5$—S—CH(CO$_2$H)CH$_2$CO$_2$H PE3 was prepared in a similar manner to PE2 from 4.02 g mercaptosuccinic acid (MW=150.15, 26.77 mmol), 32.33 g lauryl acrylate (MW=240.39, 134.5 mmol) in 80 g ethyl acetate with 1.25 g VAZO-67, which is a liquid after solvent strip.

Preparative Example 4

PE4

Preparation of H—[CH(CO$_2$C$_{18}$H$_{37-n}$)CH$_2$]$_3$—[CMe(CO$_2$H)CH$_2$]—S—CH(CO$_2$H)CH$_2$CO$_2$H PE4 was prepared in a similar manner to PE2 from 3.02 g mercaptosuccinic acid MW=150.39, (20 mmol), 19.48 g octadecyl acrylate (MW=324.55, 60 mmol) and 1.72 g methacrylic acid (MW=86.09, 20 mmol) in 80 g ethyl acetate with 1.06 g VAZO-67, which is a solid after solvent strip.

Preparative Example 5

PE5

Preparation of H—[CH(CO$_2$C$_{18}$H$_{37-n}$)CH$_2$]$_5$—[CMe(CO$_2$H)CH$_2$]$_5$—S—CH(CO$_2$H)CH$_2$CO$_2$H PE5 was prepared in a similar manner to PE2 from 1.38 g mercaptosuccinic acid (MW=150.15, 9.2 mmol), 24.35 g octadecyl acrylate (MW=324.55, 75 mmol) and 6.45 g methacrylic acid (MW=86.09, 20 mmol) in 80 g ethyl acetate with 0.86 g VAZO-67, which is a solid after solvent strip.

Preparative Example 6

PE6

Preparation of H—[CH(CO$_2$CH$_2$CH(Et)C$_4$C$_{9-n}$)CH$_2$]$_5$—S—CH(CO$_2$H)CH$_2$CO$_2$H PE6 was prepared in a similar manner to PE2 from 1.50 g mercaptosuccinic acid (MW=150.15, 10 mmol) and 9.20 g 2-ethylhexyl acrylate (184.28, 50 mmol) in 30 g ethyl acetate with 0.12 g VAZO-67, which is a solid after solvent strip.

Preparative Example 7

PE7

Preparation of H—[CMe(CO$_2$CH$_2$CH(Et)C$_4$C$_{9-n}$)CH$_2$]$_{10}$—[CMe(CO$_2$H)CH$_2$]$_2$—S—CH(CO$_2$H)CH$_2$CO$_2$H PE7 was prepared in a similar manner to PE2 from 1.50 g mercaptosuccinic acid (MW=150.15, 10 mmol), 19.83 g 2-ethylhexyl methacrylate (MW=198.31, 100 mmol) and 1.72 g methacrylic acid (MW=86.09, 20 mmol) in 60 g ethyl acetate with 0.23 g VAZO-67, which is a solid after solvent strip.

Preparative Example 8

PE8

Preparation of H—[CH(CO$_2$CH$_2$CH(Et)C$_4$C$_{9-n}$)CH$_2$]$_5$—[CH(CO$_2$C$_2$H$_4$OC(O)C$_2$H$_4$CO$_2$H)CH$_2$]—S—CH(CO$_2$H)CH$_2$CO$_2$H PE8 was prepared in a similar manner to PE2 from 1.50 g mercaptosuccinic acid (MW=150.15, 10 mmol), 9.21 g 2-ethylhexyl acrylate (MW=184.28, 50 mmol) and 2.16 g CH$_2$=CHCO$_2$CH$_2$CH$_2$OC(O)CH$_2$CH$_2$CO$_2$H (MW=216.19, 10 mmol) in 60 g ethyl acetate with 0.23 g VAZO-67, which is a solid after solvent strip.

Preparative Example 9

PE9

Preparation of H—[CH(CO$_2$CH$_2$CH(Et)C$_4$C$_{9-n}$)CH$_2$]$_5$—[CMe(CO$_2$C$_2$H$_4$OC(O)C$_2$H$_4$CO$_2$H)CH$_2$]—S—CH(CO$_2$H)CH$_2$CO$_2$H PE9 was prepared in a similar manner to PE2 from 1.50 g mercaptosuccinic acid (MW=150.15, 10 mmol), 9.21 g 2-ethylhexyl acrylate (MW=184.28, 50 mmol) and 2.30 g CH$_2$=CHCO$_2$CH$_2$CH$_2$OC(O)CH$_2$CH$_2$CO$_2$H (MW=230.21, 10 mmol) in 60 g ethyl acetate with 0.23 g VAZO-67, which is a solid after solvent strip.

Preparative Example 10

PE10

Preparation of H—[CMe(CO$_2$CH$_2$CH(Et)C$_4$C$_{9-n}$)CH$_2$]$_5$—[CMe(CO$_2$C$_2$H$_4$OC(O)C$_2$H$_4$CO$_2$H)CH$_2$]—S—CH(CO$_2$H)CH$_2$CO$_2$H PE10 was prepared in a similar manner to PE2 from 1.50 g mercaptosuccinic acid (MW=150.15, 10 mmol), 9.92 g 2-ethylhexyl methacrylate (MW=198.31, 50 mmol) and 2.30 g CH$_2$=CMeCO$_2$CH$_2$CH$_2$OC(O)CH$_2$CH$_2$CO$_2$H (MW=230.21, 10 mmol) in 40 g ethyl acetate with 0.25 g VAZO-67, which is a solid after solvent strip.

Preparative Example 11

PE11

Preparation of H—[CMe(CO$_2$CH$_2$CH(Et)C$_4$C$_{9-n}$)CH$_2$]$_8$—[CMe(CO$_2$C$_2$H$_4$OC(O)C$_2$H$_4$CO$_2$H)CH$_2$]—S—CH(CO$_2$H)CH$_2$CO$_2$H PE11 was prepared in a similar manner to PE2 from 0.75 g mercaptosuccinic acid (MW=150.15, 5 mmol), 7.93 g 2-ethylhexyl methacrylate (MW=198.31, 40 mmol) and 1.15 g CH$_2$=CMeCO$_2$CH$_2$CH$_2$OC(O)CH$_2$CH$_2$CO$_2$H (MW=230.21, 5 mmol) in 30 g ethyl acetate with 0.18 g VAZO-67, which is a solid after solvent strip.

Preparative Example 12

PE12

Preparation of H—[CMe(CO$_2$CH$_2$CH(Et)C$_4$C$_{9-n}$)CH$_2$]$_5$—[CMe(CO$_2$C$_2$H$_4$OC(O)C$_2$H$_4$CO$_2$H)CH$_2$]—S—CH$_2$CH$_2$CO$_2$H PE12 was prepared in a similar manner to PE2 from 1.06 g mercaptoproplic acid (MW=106.14, 10 mmol), 9.92 g 2-ethylhexyl methacrylate (MW=198.31, 50 mmol) and 2.30 g CH$_2$=CMeCO$_2$CH$_2$CH$_2$OC(O)CH$_2$CH$_2$CO$_2$H (MW=230.21, 10 mmol) in 30 g ethyl acetate with 0.21 g VAZO-67, which is a solid after solvent strip.

Examples 1-3 (EX1-EX3) and Comparative Examples 4-6 (CE4-CE6)

The Example and Comparative Example formulations were prepared in a nitrogen glove box except the measurement of their quantum yields.

To prepare the Example and Comparative Examples, in an 8 mL vial was charged with about 15 mg of DDSA (for CE4) or a mercaptosuccinic acid derivative ligand, PE1-PE3, prepared as described above (for EX1-EX3) followed by the addition of 1.5 ml toluene. The CE5 and CE6 were blanks and contained 1.5 ml of toluene only. To each of the toluene solutions above, was added 0.28 ml QD-1 to provide a clear solution. Then the resulting EX1-EX-3 and CE4-CE6 mixtures were aged while stirring with a magnetic stirrer for 2 hours at 60 C (2 hours at room temperature for CE6) and their QY data were measured in toluene solution at high concentration (i.e., at ~70% absorption).

Quantum yields data were obtained by using a Hamamatsu Quantaurus QY, absolute PL Quantum Yield Spectrometer C11347, obtained from Hamamatsu Corp., Middlesex, N.J. Measurements included Quantum Yield (QY, %) and absorption (%).

Table 1, below summarizes the quantum yield (QY) and absorption data for EX1-EX3 and CE4-CE6 samples after aging.

TABLE 1

| Example | Ligand used | QY (%) | Absorption (%) |
|---------|-------------|--------|----------------|
| EX1 | PE1 | 50.3 | 70.8 |
| EX2 | PE2 | 52.1 | 72.0 |
| EX3 | PE3 | 51.4 | 71.4 |
| CE4 | DDSA | 52.7 | 71.8 |
| CE5 | None | 47.2 | 70.2 |
| CE6 | None | 48.1 | 92.2 |

Examples 7-10 (EX7-EX10) and Comparative Examples 11-12 (CE11-CE12)

EX7-EX10 were prepared in the same manner as described above for EX1-EX3 except that about 15 mg of the mercapto-acid derivative ligands, PE10, PE11, PE12 and PE6, respectively, were used and 0.3 ml of QD-2 was added instead of QD-1 to form the clear toluene solutions. Then the resulting EX7-EX-10 mixtures were aged while stirring with a magnetic stirrer for 2 hours at 60 C.

CE11 and CE12 were prepared in the same manner as CE4 and CE5, respectively, except that 0.3 ml of QD-2 was added instead of QD-1 to form the clear toluene solutions.

After aging, the clear toluene solutions of EX7-EX10 and CE11-CE12 were diluted by the addition of 4 ml of hexane and their QY data were measured at medium concentration (i.e., at ~13% absorption).

Table 2, below summarizes the quantum yield (QY) and absorption data for EX7-EX10 and CE11-CE12 samples.

TABLE 2

| Example | Ligand used | QY (%) | Absorption (%) |
|---------|-------------|--------|----------------|
| EX7 | PE10 | 66.70 | 13.60 |
| EX8 | PE11 | 69.80 | 12.00 |
| EX9 | PE12 | 69.40 | 13.10 |
| E10 | PE6 | 50.90 | 13.90 |
| CE11 | DDSA | 53.00 | 12.50 |
| CE12 | None | 50.80 | 13.90 |

What is claimed is:

1. A composite particle comprising a fluorescent core/shell nanoparticle and a thioether ligand bound to the surface of the nanoparticle of the formula:

wherein

R$^1$ is hydrocarbyl group or a (meth)acrylate oligomer group;

R$^2$ is a hydrocarbyl group;

n at least one;

X is an electron-donating group.

2. The composite particle of claim 1 where X is selected from —CO$_2$H, —OH, —P(O)(OH)$_2$, —P(O)OH, —NH$_2$ and —SO$_3$H.

3. The composite particle of claim 1 wherein R$^1$ is a linear or branched alkylene having 2-50 carbon atoms.

4. The composite particle of claim 1 wherein R$^1$ is a (meth)acrylate oligomer of the formula:

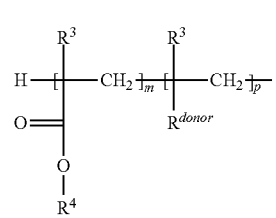

wherein each R$^3$ is independently H or CH$_3$ each R$^4$ is C$_1$-C$_{30}$ alkyl, R$^{donor}$ comprises an electron-donating group, m is at least 2;

p may be zero or non-zero.

5. The composite particle of claim 1 wherein R$^1$ is a (meth)acrylate oligomer of the formula:

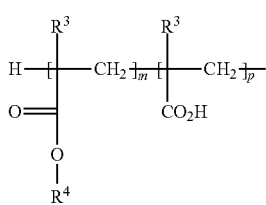

wherein
each $R^3$ is independently H or $CH_3$
Each $R^4$ is $C_1$-$C_{30}$ alkyl,
m is at least 2;
p may be zero or non-zero.

6. The composite particle of claim 1 wherein $R^1$ is a (meth)acrylate oligomer of the formula:
formula:

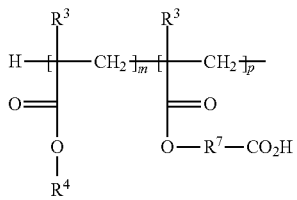

wherein
each $R^3$ is independently H or $CH_3$
Each $R^4$ is $C_1$-$C_{30}$ alkyl,
$R^7$ is a $C_2$-$C_{10}$ alkylene,
m is at least 2;
p may be zero or non-zero.

7. The composite particle of claim 4 where the ratio of m to p is at least 3:1.

8. The composite particle of claim 4 where m is 3 to 50 and p is at least one, and m>p.

9. The composite particle of claim 4 wherein $R^4$ is a $C_4$-$C_{20}$ alkyl.

10. The composite particle of claim 1 further comprising a non-thioether ligand bound to the surface of the nanoparticle of the formula:

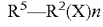

wherein
$R^5$ is (hetero)hydrocarbyl group having C2 to C30 carbon atoms;
$R^2$ is a hydrocarbyl group;
n is at least one;
X is an electron-donating group.

11. The composite particle of claim 1 wherein the ligand is of the formula:

wherein
$R^1$ is hydrocarbyl group or a (meth)acrylate oligomer group.

12. The composite particle of claim 1 wherein the core comprises InP, CdS or CdSe.

13. The composite particle of claim 1 wherein the shell comprises a magnesium or zinc-containing compound.

14. The composite particle of claim 1 wherein the shell is a multilayered shell.

15. The composite particle of claim 14 wherein the multilayered shell comprises an inner shell overcoating the core, wherein the inner shell comprises zinc selenide and zinc sulfide.

16. The composite particle of claim 14 wherein the multilayered shell comprises an outer shell overcoating the inner shell, wherein the outer shell comprises zinc sulfide or MgS.

17. The composite particle of claim 1 comprising:
a fluorescent semiconductor core/shell nanoparticle comprising:
an InP core;
an inner shell overcoating the core, wherein the inner shell comprises zinc selenide and zinc sulfide; and
an outer shell overcoating the inner shell, wherein the outer shell comprises zinc sulfide; and
a thioether ligand bound to the surface of the nanoparticle of the formula:

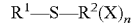

wherein
$R^1$ is hydrocarbyl group or a (meth)acrylate oligomer group;
$R^2$ is a hydrocarbyl group;
n at least one;
X is an electron-donating group.

18. A composition comprising the composite particle of claim 1 and a polymeric binder.

19. The composition of claim 18 wherein the binder comprises a (meth)acrylated oligomer.

20. The composition of claim 19 wherein the binder further comprises a reactive diluent monomer.

21. The composition of claim 19 wherein the (meth) acrylated oligomer is of the general formula:

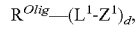

wherein
$R^{Olig}$ is selected from urethanes, polyurethanes, esters, polyesters, polyethers, polyolefins, polybutadienes and epoxies;
$L^1$ is a linking group;
$Z^1$ is a pendent, free-radically polymerizable group such as (meth)acryloyl, vinyl or alkynyl, and
d is greater than 1.

22. An article comprising the composition of claim 18 uniformly dispersed in the cured polymeric matrix binder between two barrier films.

* * * * *

UNITED STATES PATENT AND TRADEMARK OFFICE
CERTIFICATE OF CORRECTION

PATENT NO. : 9,574,132 B2  Page 1 of 1
APPLICATION NO. : 15/117474
DATED : February 21, 2017
INVENTOR(S) : Zai-Ming Qiu It is certified that error appears in the above-identified patent and that said Letters Patent is hereby corrected as shown below:

In the Specification

Column 4,
Line 42, delete "AN," and insert -- AlN, --, therefor.

Column 5,
Line 13, delete "AN," and insert -- AlN, --, therefor.
Line 14, delete "AN," and insert -- AlN, --, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*